(No Model.)

J. V. HECKER.
DRIVING MECHANISM FOR ROLLER MILLS.

No. 321,600. Patented July 7, 1885.

WITNESSES
R. H. Reille
John T. Delehanty

John V. Hecker INVENTOR
by Lewis W. Hyde Jr.
Attorney

UNITED STATES PATENT OFFICE.

JOHN V. HECKER, OF NEW YORK, N. Y.

DRIVING MECHANISM FOR ROLLER-MILLS.

SPECIFICATION forming part of Letters Patent No. 321,600, dated July 7, 1885.

Application filed January 8, 1885. (No model.)

*To all whom it may concern:*

Be it known that I, JOHN V. HECKER, a resident of the city, county, and State of New York, have invented a new and useful Improvement in Driving Mechanism for Roller-Mills, of which the following is a specification.

My invention relates to driving mechanism for roller-mills; and it consists in the combination of elements hereinafter described and claimed.

Figure 1:
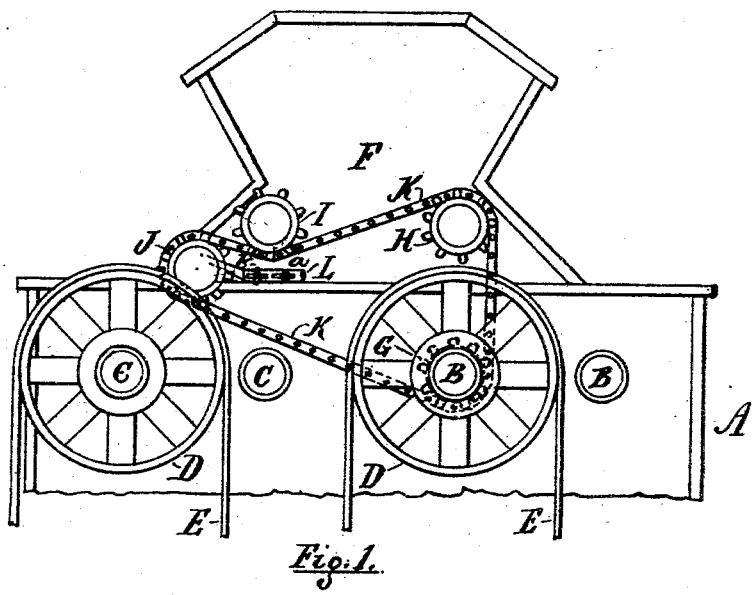
Figure 2:
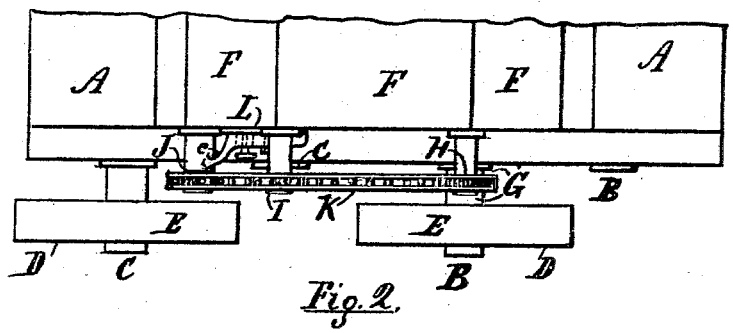

Figure 1 is a side or end elevation of a roller-mill provided with pulleys, chain-belt, and the device for tightening the belt. Fig. 2 is a plan or horizontal view of the same, partly broken away.

A represents the roller-mill provided with two pairs of crushing-rolls, B B and C C, each pair being provided with a driving-pulley, D, over each of which passes a driving-belt, E, as usual.

Upon the mill A is the feed-hopper F, containing two feed-rolls, as usual. One of the driving-shafts of one pair of the crushing-rolls is provided with a spur or sprocket wheel, G, located behind the driving-pulley. The feed-roller shafts are provided with spur or sprocket wheels H and I on their ends, and J is another sprocket or spur wheel on the end of a shaft running in a sleeve extending out from the hopper F, not attached thereto, but supported by a bracket, as hereinafter described. The four sprocket or spur wheels G, H, I, and J are geared together by a chain-belt, K, passing around and rotating them, and the sleeve supporting the wheel J and its shaft is attached to a slotted tightener-bracket, L. The bracket L is secured to the box of the roller mill or hopper by a screw and nut at *a*, the stem of the screw passing through a slot in a plate secured to the wooden side of the box and through a hole in the bracket, the screw having a head back of the slotted plate and the nut on the outside, so that it may be readily loosened to permit the horizontal adjustment of the bracket.

At *b* is a thumb-screw passing through a slot in the bracket, and a hole in the slotted plate fastened to the box and having a nut back of the slotted plate. The end *c* of the bracket is secured to the sleeve, within which the shaft of spur-wheel J revolves, or it is formed as a part thereof.

By loosening the screws *a* and *b* the bracket may be moved along readily so as to tighten the chain-belt which gears with the sprocket or spur wheels, and by tightening up the screws *a* and *b* is held in the position required.

What I claim as new, and desire to secure by Letters Patent of the United States, is—

In a roller-mill, the combination of the two pairs of crushing-rolls and suitable driving mechanism therefor, one of the shafts of said rolls being provided with a spur or sprocket wheel, G, the hopper, the feed-rolls provided with spur or sprocket wheels H and I at their ends, the sprocket-wheel J and its sleeve and shaft, the chain-belt K, passing around or rotating said spur or sprocket wheels G, H, I, and J, the slotted tightener-bracket L, and the screws *a* and *b* for adjusting said bracket, substantially as shown and described.

JOHN V. HECKER.

Witnesses:
ALLAN A. IRVINE,
WILLIAM TEED.